United States Patent
Dutta et al.

(10) Patent No.: US 12,438,943 B2
(45) Date of Patent: Oct. 7, 2025

(54) SYSTEM AND METHOD FOR OFFLOADING PREPROCESSING OF MACHINE LEARNING DATA TO REMOTE STORAGE

(71) Applicant: Nutanix, Inc., San Jose, CA (US)

(72) Inventors: Debojyoti Dutta, San Jose, CA (US); Johnu George, Bangalore (IN); Manosiz Bhattacharyya, San Jose, CA (US); Roger Liao, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 169 days.

(21) Appl. No.: 17/981,077

(22) Filed: Nov. 4, 2022

(65) Prior Publication Data

US 2023/0156083 A1    May 18, 2023

(30) Foreign Application Priority Data

Nov. 17, 2021    (IN) .............................. 202141052691

(51) Int. Cl.
    *H04L 67/1097*    (2022.01)
    *G06F 9/455*    (2018.01)

(52) U.S. Cl.
    CPC ...... *H04L 67/1097* (2013.01); *G06F 9/45533* (2013.01)

(58) Field of Classification Search
    CPC .......................... H04L 67/1097; G06F 9/45533
    See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,336,132 B1 | 5/2016 | Aron et al. |

(Continued)

FOREIGN PATENT DOCUMENTS

| | | |
|---|---|---|
| CN | 116226652 A | 6/2023 |
| KR | 20220147795 A | 11/2022 |

OTHER PUBLICATIONS

"Better performance with the tf.data API _TensorFlow Core," https://www.tensorflow.org/guide/data_performance#parallelizing_data_extraction, pp. 1-22.

(Continued)

*Primary Examiner* — Glenton B Burgess
*Assistant Examiner* — Jihad K Boustany
(74) *Attorney, Agent, or Firm* — Foley & Lardner LLP

(57) ABSTRACT

An illustrative embodiment disclosed herein is an apparatus including a processor having programmed instructions to place a first compute resource in a storage node of an object storage platform and to place a second compute resource in a compute node in a client coupled to the object storage platform via a public network. In some embodiments, unstructured data is stored in the storage node. In some embodiments, the first compute resource of the storage node preprocesses the unstructured data. In some embodiments, the preprocessed unstructured data is sent to the compute node. In some embodiments, the second compute resource trains a machine learning (ML) model using the preprocessed unstructured data.

23 Claims, 5 Drawing Sheets

(56) References Cited

U.S. PATENT DOCUMENTS

| | | | |
|---|---|---|---|
| 9,652,265 | B1 | 5/2017 | Narayanasamy et al. |
| 9,772,866 | B1 | 9/2017 | Aron et al. |
| 11,494,692 | B1* | 11/2022 | Watkins .............. H04L 67/1089 |
| 11,954,521 | B2* | 4/2024 | Lin ........................ G06N 20/00 |
| 2016/0277497 | A1* | 9/2016 | Bannister ............ H04L 67/1097 |
| 2018/0060402 | A1* | 3/2018 | Fabjanski ............. G06F 16/254 |
| 2020/0050607 | A1* | 2/2020 | Pal ..................... G06F 16/24549 |
| 2021/0004651 | A1* | 1/2021 | Sainani .............. G06V 40/1347 |
| 2021/0105322 | A1* | 4/2021 | Sakashita ............ H04L 67/1097 |
| 2021/0192279 | A1* | 6/2021 | Laaksonen ............. G16H 30/20 |
| 2023/0072311 | A1* | 3/2023 | Oliner ................. G06F 16/3332 |

OTHER PUBLICATIONS

"XML and More: OCI?Knowing Object Storage Basics" (Jan. 13, 2019), http://xmlandmore.blogspot.com/2019/01/ociknowing-object-storage-basics.html, pp. 1-6.

Cano, Ignacio, et al. "Curator: Self-Managing Storage for Enterprise Clusters" (Mar. 27, 2017), from https://www.usenix.org/conference/nsdi17/.

Hunt Randall, "S3 Select and Glacier Select—Retrieving Subsets of Objects|AWS News Blog," (Nov. 29, 2017), https://aws.amazon.com/blogs/aws/s3-glacier-select/, pp. 1-4.

John Thas Robert, "Machine Learning for Data Analysts—BigQuery ML|by Robert Thas John|Towards Data Science," (May 20, 2019), https://towardsdatascience.com/machine-learning-for-data-analysts-bigquery-ml-b60ef05e43c2, pp. 1-18.

Kannapur Kartik, Krishnamoorthy Bala, Jothikumar Prithiviraj, "Data preprocessing for machine learning on Amazon EMR made easy with AWS Glue DataBrew|AWS Big Data Blog," (Nov. 23, 2020), https://aws.amazon.com/blogs/big-data/data-preprocessing-for-machine-learning-on-amazon-emr-made-easy-with-aws-glue-databrew/, pp. 1-20.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

A Selective Preprocessing Offloading Framework for Reducing Data Traffic in DL Training https://dl.acm.org/doi/pdf/10.1145/3655038.3665947, Jul. 8, 2024.

PreSto: An In-Storage Data Preprocessing System for Training Recommendation Models, https://arxiv.org/pdf/2406.14571v1, Jun. 11, 2024.

* cited by examiner

200 — Place a first compute resource in a storage node of an object storage platform, wherein the first compute resource of the storage node preprocesses the unstructured data
202

Place a second compute resource in a compute node of a client, wherein the second compute resource trains a machine learning (ML) model using the preprocessed unstructured data
204

FIG. 2

SYSTEM AND METHOD FOR OFFLOADING PREPROCESSING OF MACHINE LEARNING DATA TO REMOTE STORAGE

PRIORITY CLAIM

This application claims priority to Indian Provisional Patent Application No. 202141052691, filed Nov. 17, 2021, which application is hereby incorporated by reference in its entirety.

BACKGROUND

Training machine learning models can require providing input data for models to ingest. Input pipelines for machine learning jobs can be challenging to implement efficiently as they can require reading large volumes of data, applying complex transformations, and transferring data to hardware accelerators while overlapping computation and communication to achieve optimal performance.

SUMMARY

Aspects of the present disclosure relate generally to a computing environment, and more particularly to a system and method for offloading preprocessing of machine learning data to remote storage.

An illustrative embodiment disclosed herein is an apparatus including a processor having programmed instructions to place a first compute resource in a storage node of an object storage platform and to place a second compute resource in a compute node in a client coupled to the object storage platform via a public network. In some embodiments, unstructured data is stored in the storage node. In some embodiments, the first compute resource of the storage node preprocesses the unstructured data. In some embodiments, the preprocessed unstructured data is sent to the compute node. In some embodiments, the second compute resource trains a machine learning (ML) model using the preprocessed unstructured data.

Another illustrative embodiment disclosed herein is a non-transitory computer readable storage medium comprising instructions stored thereon that, when executed by a processor, cause the processor to place a first compute resource in a storage node of an object storage platform and to place a second compute resource in a compute node in a client coupled to the object storage platform via a public network. In some embodiments, unstructured data is stored in the storage node. In some embodiments, the first compute resource of the storage node preprocesses the unstructured data. In some embodiments, the preprocessed unstructured data is sent to the compute node. In some embodiments, the second compute resource trains a machine learning (ML) model using the preprocessed unstructured data.

Another illustrative embodiment disclosed herein is a method including a processor placing a first compute resource in a storage node of an object storage platform and the processor placing a second compute resource in a compute node in a client coupled to the object storage platform via a public network. In some embodiments, unstructured data is stored in the storage node. In some embodiments, the first compute resource of the storage node preprocesses the unstructured data. In some embodiments, the preprocessed unstructured data is sent to the compute node. In some embodiments, the second compute resource trains a machine learning (ML) model using the preprocessed unstructured data.

Further details of aspects, objects, and advantages of the disclosure are described below in the detailed description, drawings, and claims. Both the foregoing general description and the following detailed description are exemplary and explanatory, and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2 illustrates a flowchart of an example method for offloading preprocessing of machine learning data, in accordance with some embodiments of the present disclosure;

Figure 1:
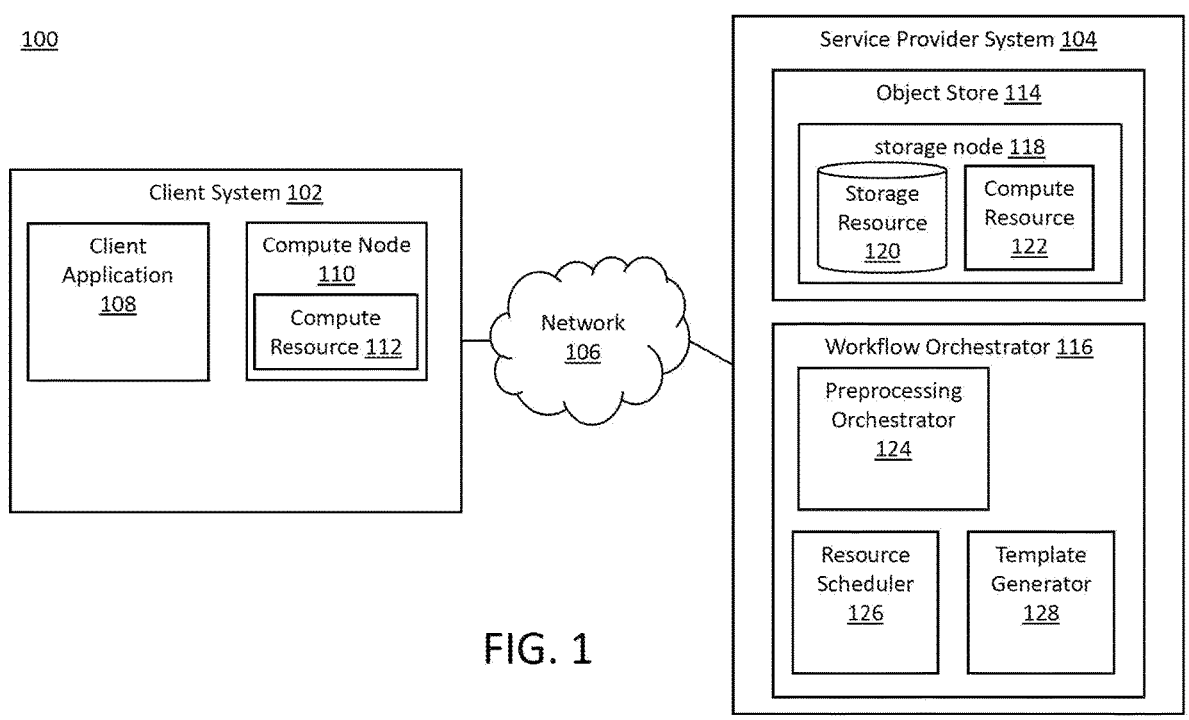
FIG. 1 illustrates a system for offloading preprocessing of machine learning data, in accordance with some embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Machine learning (ML) can include gathering data from backend storages, preprocessing the data, and using the data to train ML models. Backend storages for ML data can include remote object stores, which can give favorable throughput for large files, or file stores, which can be used for small files. Storage throughput varies based on the backend storage and data type. Thus, the backend storage can be adapted to optimized storage throughput. However, the preprocessing step for model training that can adapt well for all types of backend storages can be complex and challenging to implement. ML training jobs are severely impacted if input/output (TO) performance cannot match with training computation. Without improvements, data IO performance cannot match with the accelerators which perform the training job.

Some embodiments handle some of these challenges by primarily targeting local storage. Whole data is fetched from remote storage and brought to a local compute node, where the data is transformed and fed into model training. This can be inefficient in terms of compute resources and compute time. What is needed is a system and method that optimizes the whole input pipeline by pushing the necessary data preprocessing steps into the storage tier.

Disclosed herein are embodiments of a system and method that offloads data preprocessing steps of an input pipeline into the storage tier. Embodiments of the system and method can place a first compute resource in a storage node of an object storage platform to perform the preprocessing and a second compute resource in a compute node in a client to train the ML model with the preprocessed data. Moving the computation closer to where data resides can provide a cost effective solution by saving compute resources which can then be used for model training and reducing total compute time.

In some embodiments, objects are partitioned into chunks that are distributed across a cluster of nodes. By moving compute to storage tier, embodiments disclosed herein exploit data locality by placing compute over various storage chunks in parallel, thereby effectively using compute resources distributed across object storage nodes. In some embodiments, model training is performed by accelerators such as graphics processor units. By placing compute on accelerator-enabled nodes, preprocessing steps can be accelerated and match the speed of the model training job. In some embodiments, the method and system can split input pipelines across storage and compute nodes. This can be useful when there are enough resources at the compute layer or for operations that result in increase in data volume after applying the operation. The input pipeline can be executed in the storage tier of a hyper-converged infrastructure (HCI) architecture.

FIG. 1 illustrates a system 100 for offloading preprocessing of machine learning data, in accordance with some embodiments. The system 100 includes a client system 102, a service provider system 104, and a network 106 coupling the client system 102 to the service provider system 104. In some embodiments, the client system 102 is hosted on a datacenter, an on-premises infrastructure, a cloud, a cluster of nodes, a device, etc. The client system 102 can include one or more processors.

The client system 102 includes one or more client applications 108. The client application 108 can refer to or include any program configured to access an object store 114 provided by the service provider system 104. The client application 108 can include, for example, a web browser that can communicate using a network protocol with the service provider system 104 that provides objects in the object store 114. The client application 108 can be a machine learning application. The client application 108 can train a machine learning (ML) model using data (e.g., ML data, object data, unstructured data, immutable data, files, a combination thereof, etc.) preprocessed by the storage node 118. In some embodiments, the client application 108 is a set of instructions on a storage medium that is executed by a processor.

The client system 102 includes one or more compute nodes 110. Each compute node 110 can include a physical node/host/machine, a virtual machine, a container, etc. In some embodiments, each compute node 110 includes one or more compute resources 112. Each compute resource 112 can include a processor, a physical processor, a virtual processor, etc. In some embodiments, the compute resource 112 trains a ML model using the data preprocessed by the storage node 118. In some embodiments, the compute resource 112 executes the client application 108 to train the ML model using the data.

In some embodiments, the service provider system 104 can be hosted by a third-party cloud service provider. The service provider system 104 can be hosted in a cloud such as a public cloud, a private cloud, a hybrid cloud, a multi-cloud, or a co-location facility. The service provider system 104 can be hosted in a private data center, or on one or more physical servers, virtual machines, or containers of an entity or customer. The service provider system 104 can be remote from the client system 102. For example, the client system 102 accesses the service provider system 104 through a public network (e.g., the network 106). The service provider system 104 can be hosted on or refer to cloud 310 depicted in FIG. 3B.

The service provider system 104 includes the object store 114. The object store 114 can be referred to as an object storage platform. The object store 114 can store objects (e.g., object data). An object can be composed of the object itself and metadata about the object. An object can include unstructured data. An object can include immutable data. The object store 114 can include buckets which are logical constructs where the objects are stored. Each bucket can be associated with a single set of resources. Each bucket can be associated with a single set of policies. The buckets can be backed by virtual disks. The object store 114 can have a flat hierarchy (e.g., no directory, sub-folders, or sub-buckets). The object store 114 can have a single namespace or a unique namespace for each of multiple tenants (e.g., users). Objects can be managed using a representational state transfer (RESTful) application programming interface (API) build on hypertext transfer protocol (HTTP) verbs (e.g., standard HTTP verbs such as GET, PUT, DELETE). Users can define object names when they upload an object. The object store 114 can prepend an object store namespace string and a bucket name to the object name. A directory structure can be simulated by adding a prefix string that includes a forward slash.

The object store 114 includes one or more storage nodes 118. In some embodiments, one or more storage nodes 118 include one or more storage resources 120. In some embodiments, one or more storage nodes 118 include one or more compute resources 122. In some embodiments, one or more storage nodes 118 are accelerator-enabled nodes. An accelerator-enabled node can run, include, or otherwise operate with or responsive to an accelerator such as a graphics processing unit (GPU). In some embodiments, one or more storage nodes 118 include one or more storage resources 120 and one or more compute resources 122. The compute resources 122 may be similar to the compute resources 112.

In some embodiments, one or more storage nodes 118 are hyper-converged infrastructure (HCI) nodes. An HCI node is a node that includes virtualized storage, compute, and network resources. In some embodiments, the HCI node is software-defined and can scale a number of resources based on demand. In some embodiments, the resources of the HCI node are managed by a single control plane. In some embodiments, the storage resources of an HCI node are accessible from any of the compute resources in the HCI node.

The service provider system 104 includes a workflow orchestrator 116. The workflow orchestrator 116 can execute an input pipeline to ML training jobs. The input pipeline of ML training can be described as an extract, transform, and load (ETL) process. A first stage reads input data from a storage system. A second stage preprocesses (e.g., transforms) data to a format suitable for ML training computation. The second stage can apply transformations such as sampling, permuting, or filtering data to extract the subset of most relevant features. A third stage loads the data onto a device, such as an accelerator device, that executes the training computation.

The workflow orchestrator 116 can be accessed or tested over the network 106. The workflow orchestrator 116 can include a software-as-a-service (SaaS) application, such as a word processing application, spreadsheet application, presentation application, electronic message application, file storage system, productivity application, or any other SaaS application. The workflow orchestrator 116 can be hosted in one or more nodes (e.g., servers), virtual machines, or containers. A virtual machine can refer to an entity with its own operating system and software applications. Virtual machines can run on top of a hypervisor and consume virtualized compute, storage, and network resources. Containers can share the host operating system, and in some embodiments, the host binaries and libraries. Containers can be isolated from one another and the host on which the container is hosted. Containers can have their own namespace and bundle their own software applications, libraries, process identifiers (IDs), configuration files, and APIs.

In some embodiments, the workflow orchestrator 116 includes a preprocessing orchestrator 124. The preprocessing orchestrator 124 can determine where to execute different preprocessing steps of a workflow. For example, the preprocessing orchestrator 124 can determine to execute preprocessing in the storage node 118. In some embodiments, the preprocessing includes one or more of filtering, parsing, interleaving, mapping, or prefetching. In some embodiments, the preprocessing orchestrator 124 can determine to execute all of the preprocessing steps in a storage node 118 in the object store 114.

The preprocessing orchestrator 124 can determine to execute some of the preprocessing steps in a storage node 118 in the object store 114 and some of the preprocessing steps in a compute node 110 in the client system 102 (e.g., instead of offloading the input pipeline entirely to a storage tier). For example, the preprocessing orchestrator 124 can determine to execute one or more of filtering, parsing, or interleaving in the storage node 118 and mapping in the compute node 110. In some embodiments, the preprocessing orchestrator 124 determines to execute some of the preprocessing steps in the compute node 110 upon determining that the compute node 110 has greater than a threshold amount or number of compute resources 112. For example, users may have reserved a number of GPUs and CPUs for model training that is larger than the threshold number.

In some embodiments, the preprocessing orchestrator 124 determines to execute some of the preprocessing steps in the compute node 110 for operations that result in an increase of data volume after applying the operation. For example, when a mapping operation maps an input size to an output size greater than (e.g., at least two times) the input size, the preprocessing orchestrator 124 can determine to execute mapping in the compute node 110. In some embodiments, the preprocessing orchestrator 124 can determine to execute prefetching at both of the storage node 118 (e.g., a memory buffer at the storage node) and the compute node 110 (e.g., a memory buffer at the compute node 110).

In some embodiments, the preprocessing orchestrator 124 can determine that data is partitioned into chunks that are distributed across multiple storage nodes 118 (e.g., a cluster of storage nodes 118) in the object store 114. In some embodiments, the preprocessing orchestrator 124 can determine to execute preprocessing of a first chunk in a first storage node of the multiple storage nodes 118 in which the first chunk is stored and to execute preprocessing of a second chunk in a second storage node of the multiple storage nodes 118 in which the second chunk.

The service provider system 104 includes a resource scheduler 126. In some embodiments, the resource scheduler 126 places (e.g., reserves, assigns, schedules, etc.) a compute resource 122 in the storage node 118 to preprocess data stored in a storage resource 120. In some embodiments, the resource scheduler 126 places a compute resource 112 in the compute node 110 to train a ML model using data preprocessed in the storage node 118 (e.g., after the preprocessed data is sent to the client system 102 or the compute node 110). When placing a compute resource, the service provider system 104 can take into consideration various node utilization parameters such as free central processing unit (CPU)/memory or current CPU/memory utilization.

In some embodiments, the resource scheduler 126 places a compute resource 122 in the storage node 118 to perform multiple preprocessing steps on data stored in a storage resource 120. In some embodiments, the resource scheduler 126 places a compute resource 122 in the storage node 118 to perform a first preprocessing step on data stored in a storage resource 120 and a compute resource 112 in the compute node 110 to perform a second preprocessing step on the data preprocessed by the first preprocessing step (e.g., after the data preprocessed by the first preprocessing step is sent to the client system 102 or the compute node 110).

In some embodiments, the resource scheduler 126 places one of the compute resources 122 in one of the storage nodes 118 to preprocess a first chunk of data stored in one of the storage resources 120 in the one of the storage nodes 118 and a second one of the compute resources 122 in a second one of the storage nodes 118 to preprocess a second chunk of data stored in a one of the storage resources 120 in the second one of the storage nodes 118. In some embodiments, the resource scheduler 126 places a compute resource 122 in a storage node 118 that is an accelerator-enabled node.

The service provider system 104 includes a template generator 128. In some embodiments, the template generator 128 generates a template for preprocessing. The template can be shared across multiple ML training jobs. The template can be generated for preprocessing steps that are common. For example, the template generator 128 can generate a template that includes masking (e.g., filtering-out) personal identifiable information (PII) in the data. An administrator can add the template to any data including PII. Whenever ML training is invoked on the data, the template is executed in the storage node 118 followed by user-level (e.g., customizable) input pipelines/pipeline steps. In another example, the template generator 128 can generate a template for common preprocessing steps for image classification. The template can be reused by users who are executing image classification jobs.

The network 106 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 106 may include a wireless link, such as an infrared channel or satellite band. The topology of the network 106 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), long-term evolution ("LTE"), or 5G new radio ("NR"). Different types of data may be transmitted via different protocols, or the same types of data may be transmitted via different protocols.

Each of the client system 102 or the service provider system 104 can include or utilize at least one processing unit or other logic device such as programmable logic array engine, or module configured to communicate with one another or other resources or databases. The system 100 and its components can include hardware elements, such as one or more processors, logic devices, or circuits.

Referring now to FIG. 2, a flowchart of an example method 200 for offloading preprocessing of machine learning data is shown, in accordance with some embodiments of the present disclosure. The method 200 may be implemented using, or performed by one or more of the systems (e.g., the system 100, the network environment 300, the cloud computing environment 301, or the computing device 303), one or more components (e.g., the workflow orchestrator 116, the preprocessing orchestrator 124, the resource scheduler 126, the template generator 128, etc.) of one or more of the systems, or a processor associated with one or more of the systems or one or more components. Additional, fewer, or different operations may be performed in the method 200 depending on the embodiment. Additionally, or alternatively, two or more of the blocks of the method 200 may be performed in parallel.

At operation 202, a processor places a first compute resource in a storage node of an object storage platform. In some embodiments, unstructured data is stored in the storage node. In some embodiments, the first compute resource of the storage node preprocesses the unstructured data. In some embodiments, the preprocessed unstructured data is sent to a compute node of a client coupled to the object storage platform via a public network.

In some embodiments, preprocessing includes at least two preprocessing steps. In some embodiments, a first preprocessing step of the at least two preprocessing steps includes parsing the unstructured data, and wherein a second preprocessing step of the at least two preprocessing steps includes filtering the unstructured data. In some embodiments, the second compute resource further preprocesses the preprocessed unstructured data before using the preprocessed unstructured data to train the ML model.

In some embodiments, the unstructured data is partitioned into a first chunk on the storage node and a second chunk on a second storage node of the object storage platform. In some embodiments, a third compute resource preprocesses the second chunk. In some embodiments, the storage node is an accelerator-enabled node. In some embodiments, the method 200 further includes generating a template in which the first compute resource of the storage node preprocesses the unstructured data.

At operation 204, the processor places a second compute resource in the compute node. In some embodiments, the second compute resource trains a machine learning (ML) model using the preprocessed unstructured data.

Figure 3A:
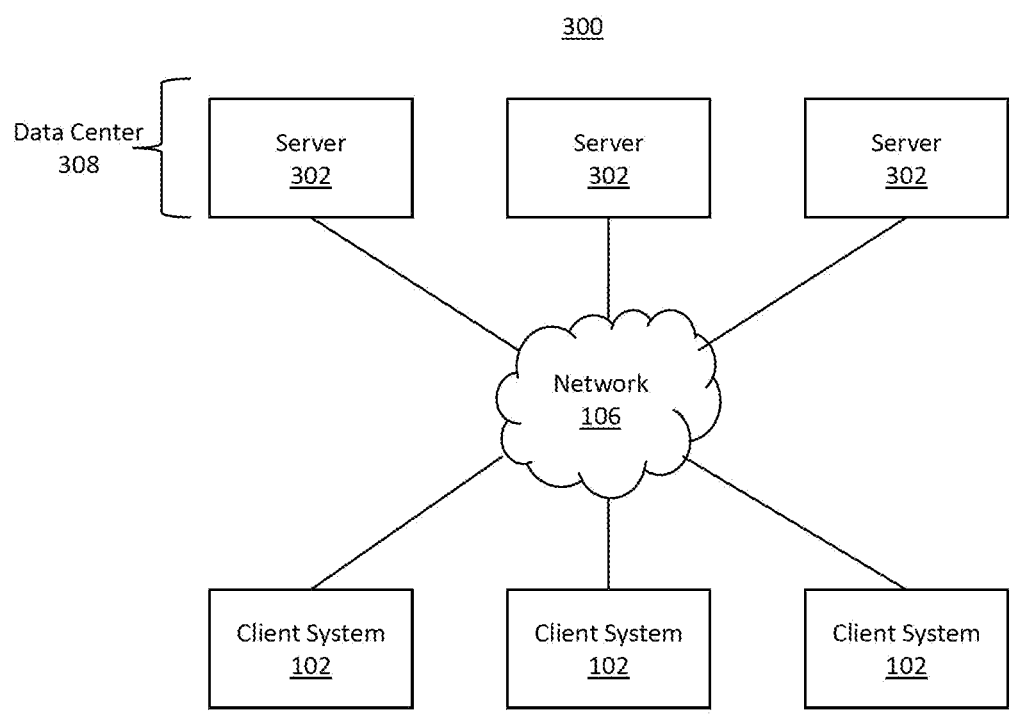
FIG. 3A is a block diagram depicting an implementation of a network environment including a client device in communication with a server device.

FIG. 3A depicts an example network environment that can be used in connection with the methods and systems described herein. In brief overview, the network environment 300 includes one or more clients devices 102 (also generally referred to as clients, client node, client machines, client computers, client computing devices, endpoints, or endpoint nodes) in communication with one or more servers 302 (also generally referred to as servers, nodes, or remote machine) via one or more networks 106. In some embodiments, a client system 102 has the capacity to function as both a client node seeking access to resources provided by a server and as a server providing access to hosted resources for other client systems 102.

Although FIG. 3A shows a network 106 between the client systems 102 and the servers 302, the client systems 102 and the servers 302 can be on the same network 106. In embodiments, there are multiple networks 106 between the client systems 102 and the servers 302. The network 106 can include multiple networks such as a private network and a public network. The network 106 can include multiple private networks.

The network 106 can include one or more component or functionality of network 106 depicted in FIG. 3A. The network 106 can be connected via wired or wireless links. Wired links can include Digital Subscriber Line (DSL), coaxial cable lines, optical fiber lines, shielded twisted pairs, or unshielded twisted pairs. The wired links can connect one or more Ethernet networks. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 106 can be any type and/or form of network. The geographical scope of the network 106 can vary widely and the network 106 can be a body area network (BAN), a personal area network (PAN), a local-area network (LAN), e.g. Intranet, a metropolitan area network (MAN), a wide area network (WAN), or the Internet. The topology of the network 106 can be of any form and can include, e.g., any of the following: point-to-point, bus, star, ring, mesh, or tree. The network 106 can be an overlay network which is virtual and sits on top of one or more layers of other networks 106. The network 106 can be of any such network topology as known to those ordinarily skilled in the art capable of supporting the operations described herein. The network 106 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 106 can be a type of a broadcast network, a telecommunications network, a data communication network, or a computer network.

The network environment 300 can include multiple, logically grouped servers 302. The logical group of servers can be referred to as a data center 308 (or server farm or machine farm). In embodiments, the servers 302 can be geographically dispersed. The data center 308 can be administered as a single entity or different entities. The data center 308 can include multiple data centers 308 that can be geographically dispersed. The servers 302 within each data center 308 can be homogeneous or heterogeneous (e.g., one or more of the servers 302 or machines 302 can operate according to one type of operating system platform (e.g., WINDOWS), while one or more of the other servers 302 can operate on according to another type of operating system platform (e.g., Unix, Linux, or Mac OS)). The servers 302 of each data center 308 do not need to be physically proximate to another server 302 in the same machine farm 308. Thus, the group of servers 302 logically grouped as a data center 308 can be interconnected using a network. Management of the data center 308 can be de-centralized. For example, one or more servers 302 can comprise components, subsystems and modules to support one or more management services for the data center 308.

Server 302 can be a file server, application server, web server, proxy server, appliance, network appliance, gateway, gateway server, virtualization server, deployment server, SSL VPN server, or firewall. In embodiments, the server 302 can be referred to as a remote machine or a node. Multiple nodes can be in the path between any two communicating servers.

Figure 3B:
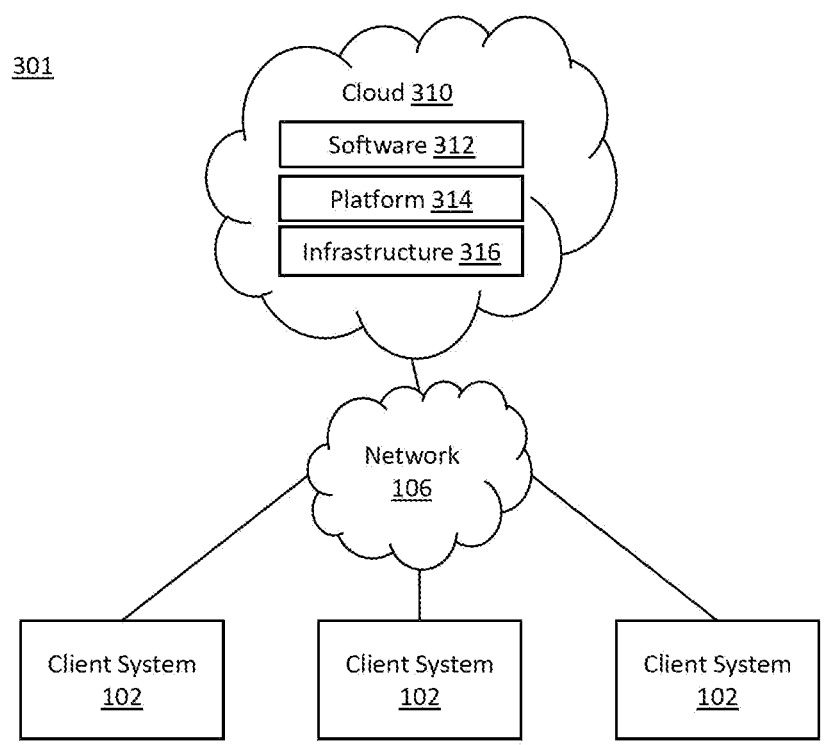
FIG. 3B is a block diagram depicting a cloud computing environment including a client device in communication with cloud service providers.

FIG. 3B illustrates an example cloud computing environment. A cloud computing environment 301 can provide client system 102 with one or more resources provided by a network environment. The cloud computing environment 301 can include one or more client systems 102, in communication with the cloud 310 over one or more networks 106. Client systems 102 can include, e.g., thick clients, thin clients, and zero clients. A thick client can provide at least some functionality even when disconnected from the cloud 310 or servers 302. A thin client or a zero client can depend on the connection to the cloud 310 or server 302 to provide functionality. A zero client can depend on the cloud 310 or other networks 106 or servers 302 to retrieve operating system data for the client device. The cloud 310 can include back end platforms, e.g., servers 302, storage, server farms or data centers.

The cloud 310 can be public, private, or hybrid. Public clouds can include public servers 302 that are maintained by third parties to the client systems 102 or the owners of the clients. The servers 302 can be located off-site in remote geographical locations as disclosed above or otherwise. Public clouds can be connected to the servers 302 over a public network. Private clouds can include private servers 302 that are physically maintained by client systems 102 or owners of clients. Private clouds can be connected to the servers 302 over a private network 106. Hybrid clouds can include both the private and public networks 106 and servers 302.

The cloud 310 can also include a cloud-based delivery, e.g. Software as a Service (SaaS) 312, Platform as a Service (PaaS) 314, and Infrastructure as a Service (IaaS) 316. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client systems 102 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client system 102 and server 302 can be deployed as and/or executed on any type and form of computing device, e.g. a computer, network device or appliance capable of communicating on any type and form of network and performing the operations described herein.

Figure 3C:
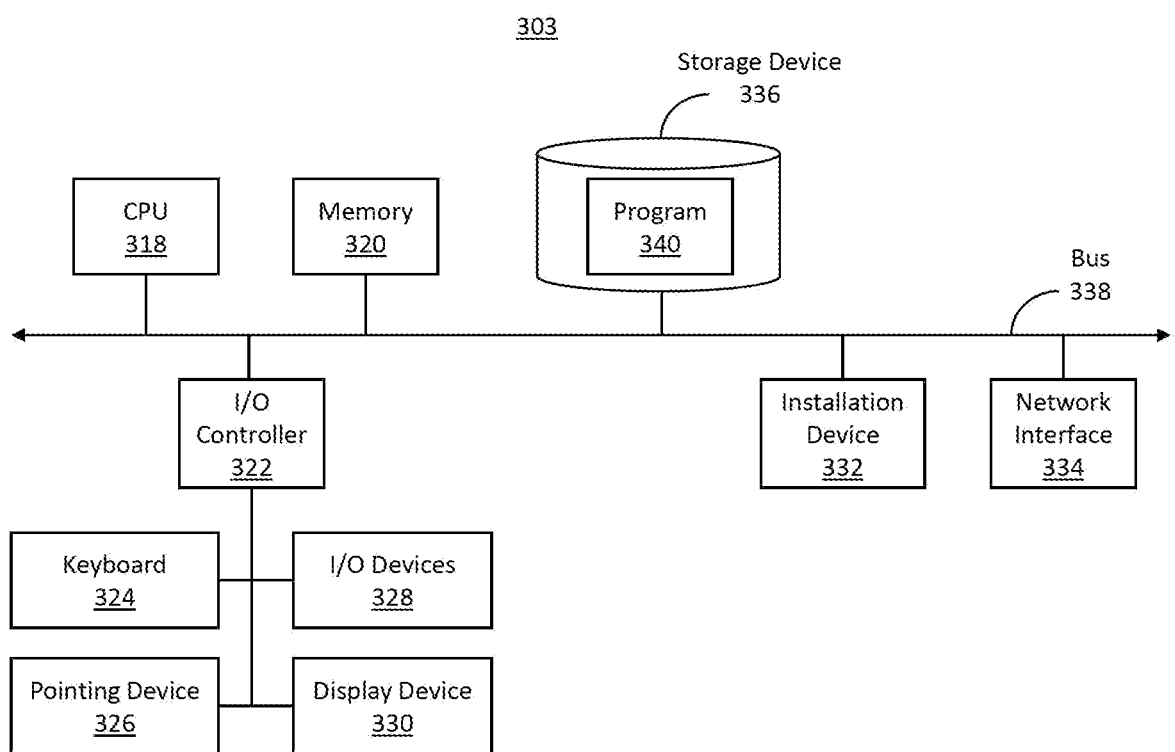
FIG. 3C is a block diagram depicting an implementation of a computing device that can be used in connection with the systems depicted in FIGS. 1, 3A, and 3B, and the method depicted in FIG. 2.

FIG. 3C depicts block diagrams of a computing device 303 useful for practicing an embodiment of the client system 102 or a server 302. As shown in FIG. 3C, each computing device 303 can include a central processing unit 318, and a main memory unit 320. As shown in FIG. 3C, a computing device 303 can include one or more of a storage device 336, an installation device 332, a network interface 334, an I/O controller 322, a display device 330, a keyboard 324 or a pointing device 326, e.g. a mouse. The storage device 336 can include, without limitation, a program, such as an operating system, software, or software associated with system 100.

The central processing unit 318 is any logic circuitry that responds to and processes instructions fetched from the main memory unit 320. The central processing unit 318 can be provided by a microprocessor unit, e.g.: those manufactured by Intel Corporation of Mountain View, California. The computing device 303 can be based on any of these processors, or any other processor capable of operating as described herein. The central processing unit 318 can utilize instruction level parallelism, thread level parallelism, different levels of cache, and multi-core processors. A multi-core processor can include two or more processing units on a single computing component.

Main memory unit 320 can include one or more memory chips capable of storing data and allowing any storage location to be directly accessed by the microprocessor 318. Main memory unit 320 can be volatile and faster than storage 336 memory. Main memory units 320 can be Dynamic random access memory (DRAM) or any variants, including static random access memory (SRAM). The memory 320 or the storage 336 can be non-volatile; e.g., non-volatile read access memory (NVRAM). The memory 320 can be based on any type of memory chip, or any other available memory chips. In the example depicted in FIG. 3C, the processor 318 can communicate with memory 320 via a system bus 338.

A wide variety of I/O devices 328 can be present in the computing device 303. Input devices 328 can include keyboards, mice, trackpads, trackballs, touchpads, touch mice, multi-touch touchpads and touch mice, microphones, multi-array microphones, drawing tablets, cameras, or other sensors. Output devices 328 can include video displays, graphical displays, speakers, headphones, or printers.

I/O devices 328 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXEL SENSE or Multi-Touch Collaboration Wall, can have larger surfaces, such as on a table-top or on a wall, and can also interact with other electronic devices. Some I/O devices 328, display devices 330 or group of devices can be augmented reality devices. The I/O devices can be controlled by an I/O controller 322 as shown in FIG. 3C. The I/O controller 322 can control one or more I/O devices, such as, e.g., a keyboard 324 and a pointing device 326, e.g., a mouse or optical pen. Furthermore, an I/O device can also provide storage and/or an installation device 332 for the computing device 303. In embodiments, the computing device 303 can provide USB connections (not shown) to receive handheld USB storage devices. In embodiments, an I/O device 328 can be a bridge between the system bus 338 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 330 can be connected to I/O controller 322. Display devices can include, e.g., liquid crystal displays (LCD), electronic papers (e-ink) displays, flexile displays, light emitting diode displays (LED), or other types of displays. In some embodiments, display devices 330 or the corresponding I/O controllers 322 can be controlled through or have hardware support for OPENGL or DIRECTX API or other graphics libraries. Any of the I/O devices 328 and/or the I/O controller 322 can include any type and/or form of suitable hardware, software, or combination of hardware and software to support, enable or provide for the connection and use of one or more display devices 330 by the computing device 303. For example, the computing device 303 can include any type and/or form of video adapter, video card, driver, and/or library to interface, communicate, connect or otherwise use the display devices 330. In embodiments, a video adapter can include multiple connectors to interface to multiple display devices 330.

The computing device 303 can include a storage device 336 (e.g., one or more hard disk drives or redundant arrays of independent disks) for storing an operating system or other related software, and for storing application software programs such as any program related to the systems, methods, components, modules, elements, or functions depicted in FIG. 1 or 2. Examples of storage device 336 include, e.g., hard disk drive (HDD); optical drive including CD drive, DVD drive, or BLU-RAY drive; solid-state drive (SSD); USB flash drive; or any other device suitable for storing data. Storage devices 336 can include multiple volatile and non-volatile memories, including, e.g., solid state hybrid drives that combine hard disks with solid state cache. Storage devices 336 can be non-volatile, mutable, or read-only. Storage devices 336 can be internal and connect to the computing device 303 via a bus 338. Storage device 336 can be external and connect to the computing device 303 via an I/O device 328 that provides an external bus. Storage device 336 can connect to the computing device 303 via the network interface 334 over a network 106. Some client devices 102 may not require a non-volatile storage device 336 and can be thin clients or zero client systems 102. Some storage devices 336 can be used as an installation device 332 and can be suitable for installing software and programs.

The computing device 303 can include a network interface 334 to interface to the network 106 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac/ax, CDMA, GSM, WiMax and direct asynchronous connections). The computing device 303 can communicate with other computing devices 303 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 334 can include a built-in network adapter, network interface card, PCMCIA network card, EXPRESSCARD network card, card bus network adapter, wireless network adapter, USB network adapter, modem or any other device suitable for interfacing the computing device 303 to any type of network capable of communication and performing the operations described herein.

A computing device 303 of the sort depicted in FIG. 3C can operate under the control of an operating system, which controls scheduling of tasks and access to system resources. The computing device 303 can be running any operating system configured for any type of computing device, including, for example, a desktop operating system, a mobile device operating system, a tablet operating system, or a smartphone operating system.

The computing device 303 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 303 has sufficient processor power and memory capacity to perform the operations described herein. In some embodiments, the computing device 303 can have different processors, operating systems, and input devices consistent with the device.

In embodiments, the status of one or more machines (e.g., client devices 102 and servers 302) in the network 106 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 303 in response to the CPU 318 executing an arrangement of instructions contained in main memory 320. Such instructions can be read into main memory 320 from another computer-readable medium, such as the storage device 336. Execution of the arrangement of instructions contained in main memory 320 causes the computing device 303 to perform the illustrative processes described herein. One or more processors in a multi-processing arrangement may also be employed to execute the instructions contained in main memory 320. Hard-wired circuitry can be used in place of or in combination with software instructions together with the systems and methods described herein. Systems and methods described herein are not limited to any specific combination of hardware circuitry and software.

Although an example computing system has been described in FIG. 3C, the subject matter including the operations described in this specification can be implemented in other types of digital electronic circuitry, or in computer software, firmware, or hardware, including the structures disclosed in this specification and their structural equivalents, or in combinations of one or more of them.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. An apparatus comprising a processor and a memory, wherein the memory includes programmed instructions that, when executed by the processor, cause the apparatus to:

assign, by a resource scheduler, a first virtualized compute resource to a storage node of an object store on a first cloud, the storage node including a virtualized storage resource, wherein unstructured data is stored in the storage node;

preprocess, by the first virtualized compute resource of the storage node, at the storage node on the first cloud, the unstructured data stored in the storage node to generate preprocessed data;

transfer, via a public network, the preprocessed data generated by the first virtualized compute resource of the storage node to a compute node on a client system separate from the first cloud; and assign, by the resource scheduler, a second virtualized compute resource to the compute node of the client system, wherein the second compute resource trains a machine learning (ML) model using the preprocessed data.

2. The apparatus of claim 1, wherein the storage node comprises a hyper-converged infrastructure (HCI) node.

3. The apparatus of claim 1, wherein the preprocessing the unstructured data comprises at least two preprocessing steps, wherein a first preprocessing step of the at least two preprocessing steps includes parsing the unstructured data, and wherein a second preprocessing step of the at least two preprocessing steps includes filtering the unstructured data.

4. The apparatus of claim 1, wherein the client system is on a second cloud.

5. The apparatus of claim 1, wherein the unstructured data is partitioned into a first chunk on the storage node and a second chunk on a second storage node of the object storage platform, wherein a third virtualized compute resource preprocesses the second chunk.

6. The apparatus of claim 1, wherein the storage node is an accelerator-enabled node.

7. The apparatus of claim 1, wherein the memory includes the programmed instructions that, when executed by the processor, further cause the apparatus to generate a template in which the first virtualized compute resource of the storage node preprocesses the unstructured data.

8. The apparatus of claim 1, wherein the memory includes the programmed instructions that, when executed by the processor, further cause the apparatus to determine, based on a mapping operation of the preprocessing the unstructured data resulting in an increase of data volume, to execute the mapping operation at the compute node of the client system.

9. A non-transitory computer readable storage medium comprising instructions stored thereon that, when executed by a processor, cause the processor to:

assign, by a resource scheduler, a first virtualized compute resource to a storage node of an object storage platform on a first cloud, the storage node including a virtualized storage resource, wherein unstructured data is stored in the storage node;

preprocess, by the first virtualized compute resource of the storage node, at the storage node on the first cloud, the unstructured data stored in the storage node to generate preprocessed data;

transfer, via a public network, the preprocessed data generated by the first virtualized compute resource of the storage node to a compute node on a client system separate from the first cloud; and assign, by the resource scheduler, a second virtualized compute resource to the compute node on the client system, wherein the second compute resource trains a machine learning (ML) model using the preprocessed data.

10. The medium of claim 9, wherein the storage node comprises a hyper-converged infrastructure (HCI) node.

11. The medium of claim 9, wherein preprocessing includes at least two preprocessing steps, wherein a first preprocessing step of the at least two preprocessing steps includes parsing the unstructured data, and wherein a second preprocessing step of the at least two preprocessing steps includes filtering the unstructured data.

12. The medium of claim 9, wherein the second virtualized compute resource further preprocesses the preprocessed unstructured data before using the preprocessed unstructured data to train the ML model.

13. The medium of claim 9, wherein the unstructured data is partitioned into a first chunk on the storage node and a second chunk on a second storage node of the object storage platform, wherein a third virtualized compute resource preprocesses the second chunk.

14. The medium of claim 9, wherein the storage node is an accelerator-enabled node.

15. The medium of claim 9, comprising the instructions stored thereon that, when executed by the processor, further cause the processor to generate a template in which the first virtualized compute resource of the storage node preprocesses the unstructured data.

16. The medium of claim 9, comprising the instructions stored thereon that, when executed by the processor, further cause the processor to determine, based on a mapping operation of the preprocessing the unstructured data resulting in an increase of data volume, to execute the mapping operation at the compute node of the client system.

17. A computer-implemented method, comprising:

assigning, by a processor associated with a resource scheduler, a first virtualized compute resource to a storage node of an object store on a first cloud, the storage node including a virtualized storage resource, wherein unstructured data is stored in the storage node;

preprocessing, by the first virtualized compute resource of the storage node, at the storage node on the first cloud, the unstructured data stored in the storage node to generate preprocessed data;

transferring, via a public network, the preprocessed data generated by the first virtualized compute resource of the storage node to a compute node on a client system separate from the first cloud; and assigning, by the processor associated with the resource scheduler, a second virtualized compute resource to the compute node on the client system, wherein the second virtualized compute resource trains a machine learning (ML) model using the preprocessed data.

18. The method of claim 17, wherein a first preprocessing step of the preprocessing includes parsing the unstructured data, and wherein a second preprocessing step of the preprocessing includes filtering the unstructured data.

19. The method of claim 17, wherein the second virtualized compute resource further preprocesses the preprocessed unstructured data before using the preprocessed unstructured data to train the ML model.

20. The method of claim 17, wherein the unstructured data is partitioned into a first chunk on the storage node and a second chunk on a second storage node of the object storage platform, wherein a third virtualized compute resource preprocesses the second chunk.

21. The method of claim 17, wherein the storage node is an accelerator-enabled node.

22. The method of claim 17, further comprising generating a template in which the first virtualized compute resource of the storage node preprocesses the unstructured data.

23. The computer-implemented method of claim 17, further comprising determining, based on a mapping operation of the preprocessing the unstructured data resulting in an increase of data volume, to execute the mapping operation at the compute node of the client system.

* * * * *